United States Patent [19]
Albagnac et al.

[11] 4,419,867
[45] Dec. 13, 1983

[54] DEVICE FOR REGULATING A JOULE-THOMSON EFFECT REFRIGERATOR

[75] Inventors: Rene D. M. Albagnac, Paris; Didier Jean-Pierre Silly, Nanterre, both of France

[73] Assignee: Societe Anonyme de Telecommunications, Paris, France

[21] Appl. No.: 394,772

[22] Filed: Jul. 2, 1982

[30] Foreign Application Priority Data

Jul. 7, 1981 [FR] France .................... 81 13346

[51] Int. Cl.³ .................... F25B 19/00
[52] U.S. Cl. .................... 62/514 JT; 236/93 R; 236/101 R; 138/45
[58] Field of Search .................... 62/514 JT; 236/93 R, 236/101 R; 251/11; 138/45

[56] References Cited

U.S. PATENT DOCUMENTS

| | | | |
|---|---|---|---|
| 2,398,262 | 4/1946 | Swart | 62/8 |
| 2,418,671 | 4/1947 | Schweller | 236/93 R |
| 3,178,149 | 4/1965 | Curzon | 251/11 |
| 3,320,755 | 5/1967 | Jepson et al. | 62/45 |
| 3,322,345 | 5/1967 | Getz | 236/97 |
| 3,548,829 | 12/1970 | Reynolds et al. | 128/303.1 |
| 3,613,689 | 10/1971 | Crump et al. | 128/303.1 |
| 4,152,903 | 5/1979 | Longsworth | 62/514 JT |

FOREIGN PATENT DOCUMENTS

| | | |
|---|---|---|
| 5048 | 10/1979 | European Pat. Off. . |
| 25021 | 3/1981 | European Pat. Off. . |
| 1550281 | 12/1968 | France . |
| 1594598 | 7/1970 | France . |
| 2136023 | 12/1972 | France . |
| 2322336 | 3/1977 | France . |

Primary Examiner—Ronald C. Capossela
Attorney, Agent, or Firm—David B. Harrison

[57] ABSTRACT

Device for regulating a Joule-Thomson effect refrigerator comprising an inlet duct for a refrigerating fluid under pressure to which a choke is connected which opens into an expansion and refrigeration chamber connecting with a passage for heat exchange with the said inlet duct, this choke being regulated to provide a decreasing flow as the refrigeration temperature drops by applying differences in the coefficients of expansion of the components making up the device, characterized in that the said choke, for this purpose, consists in a tubular body (8) connected to the said inlet duct (4) and in which an inner body is held (9, 9a), providing a passage cross-section in it which is regulated by the difference in the coefficients of expansion of the materials making up these two bodies.

8 Claims, 3 Drawing Figures

DEVICE FOR REGULATING A JOULE-THOMSON EFFECT REFRIGERATOR

The invention relates to a device for regulating a Joule-Thomson effect refrigerator or cooling device, comprising an inlet duct for cooling fluid under pressure to which a choke is connected which opens into an expansion and refrigeration chamber which connects with a passage for heat exchange with the said inlet duct; this choke is regulated to provide a decreasing flow as the refrigeration temperature drops by a system applying differences in the coefficients of expansion of the components making up the device.

Such a refrigerator may be of closed or open circuit type, and it finds special application notably on open circuit for weapons systems using projectiles with homing heads responding to infrared radiation, in which a sensitive detector cell is used which must be capable of being quickly cooled to a low temperature, theoretically the cooling fluid liquefaction temperature, and this for some time; thus the advantage of a regulation system like the one described.

The object of the present invention is a regulation device which is especially simple to produce and which also has the merit of being especially small in bulk and highly suited to the miniaturization required in the above-mentioned applications on board projectiles.

Essentially, to this end, in the above-mentioned type of Joule-Thomson effect refrigerator the regulation device according to the invention is characterized in that the said choke is made up of a tubular body connected to the inlet duct and in which an inner body is held providing a passage cross-section which is regulated by the difference in coefficients of expansion of the materials forming these two bodies.

Two embodiments of a device according to the invention are, moreover, described as examples below, reference being made to the appended drawings, in which.

Figure 1:
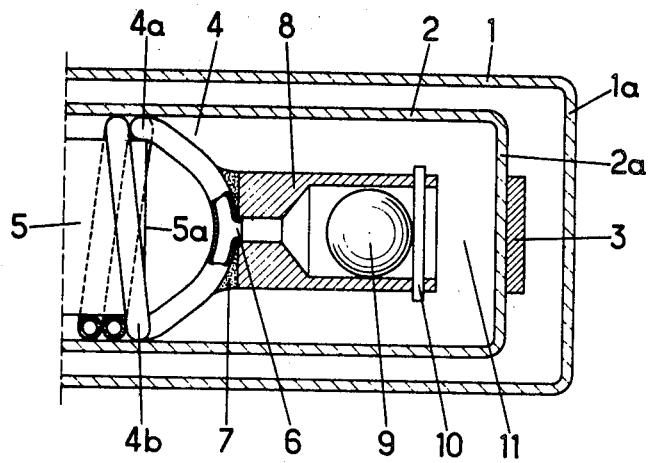
FIG. 1 is a part axial section view of a Joule-Thomson effect refrigerator provided with a regulation device according to the invention.

The refrigerator shown comprises a double-walled dewar flask 1, 2 the inner bottom wall 2a of which is provided, opposite the bottom wall 1a letting through the infrared radiation on the dewar centre line, with a detector cell 3 sensitive to infrared having connecting conductors, not shown, leaving the dewar vacuum enclosure and intended for connection to the electronic detection circuit.

Inside the inner wall of the dewar is placed an inlet duct for refrigerating fluid under high pressure, designated overall by reference 4, and here formed of a bent tubular element having two arms 4a, 4b respectively wound in a spiral round a socket 5 with a closed end 5a. The bent section is provided with a duct 6 connected, for example by welding at 7, with an expansion nozzle 8, provided with a choking component 9 held back by a pin 10 and which opens into a refrigeration chamber 11 formed by the free part of the bottom of the dewar inner wall which is not occupied by assembly 4 to 10.

The refrigerating fluid expanded into the chamber 11 is then made to leave the dewar, after heat exchange with the fluid brought in by duct 4, flowing through the space left free by this duct between the dewar inner wall 2 and the socket 5. Two flexible elastic seals which are not shown can be wound in the spiral spaces between each arm 4a, 4b of the tube to make a seal with the inner wall 2 of the dewar and force the expanded fluid to follow, in particular, the spiral path of the windings of duct 4.

The flow regulation and therefore the cooling power obtained here results from selecting two materials with differing coefficients of expansion for the nozzle 8 and the choking component 9. For example it is possible to choose the following pairs: nozzle of aluminium alloy and choking component of steel; or nozzle of steel and choking component of glass; or again nozzle of brass and choking component of sapphire.

Thus, with a nozzle with a coefficent of expansion greater than that of the choking component, it is possible to obtain in operation a relatively fast initial flow of the refrigerating fluid under pressure from its source, which is not shown, by choosing an initial preset clearance existing at the ambient temperature between the nozzle and the choke, and one which is therefore going to decrease with the refrigeration temperature reached down to a value of residual passage cross-section which can be predetermined in accordance with the liquefaction temperature of the fluid used and conditioning the topping up or cruising refrigerating power of the device.

Obviously, in the example shown in FIG. 1 a nozzle should be available having an accurately machined bore, and similarly the ball used as the choke must be accurately sized.

Figure 2:
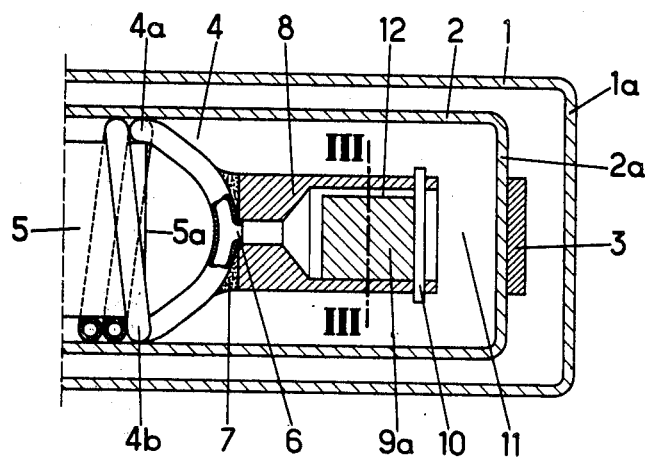
FIG. 2 is another part section view of such a refrigerator illustrating another embodiment of the regulation device.
Figure 3:
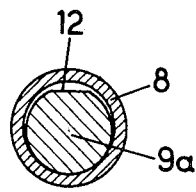
FIG. 3 is a part section view along III—III of FIG. 2.

FIGS. 2 and 3 illustrate a preferred embodiment of the nozzle-choke unit which is particularly suited for obtaining excellent control of the required regulation with ease as well as with precision.

To this end the choking component 9a consists for the greater part in a cylinder fitted into the nozzle 8 with play and having a flat 12 which is designed to delimit, with the nozzle and at the required refrigeration temperature, a residual passage cross-section, for which the nozzle will be hugging the cylindrical part of this choke, which cross-section can be accurately predetermined and correspond at the same time to a cross-section favouring non-obstruction of this passage by possible impurities in the refrigerating fluid. This residual passage cross-section may also be formed by a notch chosen in such a way as to give a more regular cross-section depending on the impurities to be expected.

Of course still further variants can be thought of whilst still remaining within the framework of the invention.

We claim:

1. A miniaturized device for regulating a Joule-Thomson effect refrigerator comprising:
   a housing;
   inlet duct means in said housing for carrying a refrigerating fluid under pressure;
   choke means connected to and communicating with said inlet duct means, said choke means including a tubular member and an inner body in said tubular member and defining a refrigerating fluid passage therebetween,
   said tubular member being of a material having a different coefficient of expansion than the material of said inner body;

said housing defining an expansion and refrigeration chamber into which said choke opens, said chamber connecting with a passage formed by said housing and said inlet duct means for providing heat exchange from said expanded fluid in said chamber to said refrigerating fluid under pressure in said duct means;

said choke means being regulated to provide a decreasing flow of said refrigerating fluid as the refrigeration temperature drops to an operational temperature in accordance with the differences in said coefficients of expansion of said tubular member and said inner body, and wherein said inner body is designed to act as a shut-off means by expanding radially to occupy said refrigerating fluid passage in the tubular member at said operational refrigeration temperature except for a minimum flow passage defined between said member and said inner body which then enables a minimum flow of the expanded refrigerating fluid.

2. The device according to claim 1, characterized in that said tubular member is cylindrical, as in the inner body, with the latter being provided with a notch designed to provide the said minimum flow of refrigerating fluid.

3. A miniaturized flow-regulated Joule-Thomson effect refrigerator for chilling a radiant enegy detector cell to a predetermined low operating temperature and for maintaining said cell at said low temperature during use, said refrigerator comprising:

housing means having an enclosing endwall for mounting said cell on the outside thereof and for defining an interior refrigeration chamber;

socket means disposed inside said housing means and having an endwall forming one boundary of said refrigeration chamber opposite the endwall of said housing means;

inlet duct means for carrying refrigerating fluid under high pressure to said refrigeration chamber, said duct located in a space between the inside cylindrical surface of said housing and the outside cylindrical surface of said socket, said space defining a passage for providing heat exchange from expanded refrigerating fluid from said refrigeration chamber, said duct connected to a common junction in said refrigeration chamber;

an expansion nozzle in said refrigeration chamber mounted to and communicating with said common junction, said nozzle defining an axial interior space and a mouth opening into said refrigeration chamber in a direction toward said cell-supporting endwall of said housing;

a choking member disposed in said axial interior space of said nozzle, said choking member of a material having a different coefficient of expansion than said nozzle and having a predetermined ambient temperature cross-section and geometry smaller than the ambient temperature cross-section of said axial interior space of said nozzle to provide an initial preset clearance therebetween which rapidly decreases in use as the temperature of said refrigeration chamber drops until a predetermined residual clearance is reached for passing refrigerating fluid to maintain said chamber at said low operational temperature.

4. The Joule-Thomson effect refrigerator set forth in claim 3 wherein said axial space in said nozzle is cylindrical and wherein said choke therein is substantially cylindrical and defines said residual clearance as a passageway between a portion of the outer surface thereof and a cojacent portion of the inner surface of said nozzle defining said axial space.

5. The Joule-Thomson effect refrigerator set forth in claim 4 wherein said choke defines a longitudinal flat on its surface having a predetermined dimension for passing refrigerating fluid and any potential solid impurities therein.

6. The Joule-Thomson effect refrigerator set forth in claim 4 wherein said choke defines a longitudinal notch of a predetermined dimension for passing refrigerating fluid and any potential solid impurities therein.

7. The Joule-Thomson effect refrigerator set forth in claim 3 wherein said inlet duct comprises two tubular portions disposed as interdigitated helical coils wound about said socket and being joined together at said common junction in said refrigeration chamber.

8. The Joule-Thomson effect refrigerator set forth in claim 3 wherein said housing means comprises a double walled cylindrical dewar flask having an outer portion and an inner portion, said enclosing endwall being formed as an endwall of said inner portion, the space between said outer portion and said inner portion providing a vacuum enclosure for said detector cell, said inner portion defining in its interior said refrigeration chamber.

* * * * *